Feb. 27, 1923.

R. H. LANSING.
ROTARY CUTTER.
FILED APR. 6, 1921.

INVENTOR
R. H. LANSING
Joseph J. O'Brien
ATTORNEY

Patented Feb. 27, 1923.

1,447,091

UNITED STATES PATENT OFFICE.

RICHARD H. LANSING, OF CHICOPEE FALLS, MASSACHUSETTS.

ROTARY CUTTER.

Application filed April 6, 1921. Serial No. 459,185.

*To all whom it may concern:*

Be it known that RICHARD H. LANSING, a citizen of the United States of America, residing at Chicopee Falls, in the county of Hampden and State of Massachusetts, has invented certain new and useful Improvements in Rotary Cutters, of which the following is a specification.

This invention relates to improvements in shearing machines and its leading object is to provide a machine for shearing fabric by a diagonal cut and embodies a traveling rotary cutter and means for imparting a forward and a reverse movement to this cutter together with means for raising a cutter to an inoperative or non-cutting position when the cutter reaches the end of its cutting stroke.

With the above and other objects in view this invention relates to certain new and useful constructions, combinations and arrangements of parts clearly described in the following specification and fully illustrated in the accompanying drawings, in which.

Figure 1:
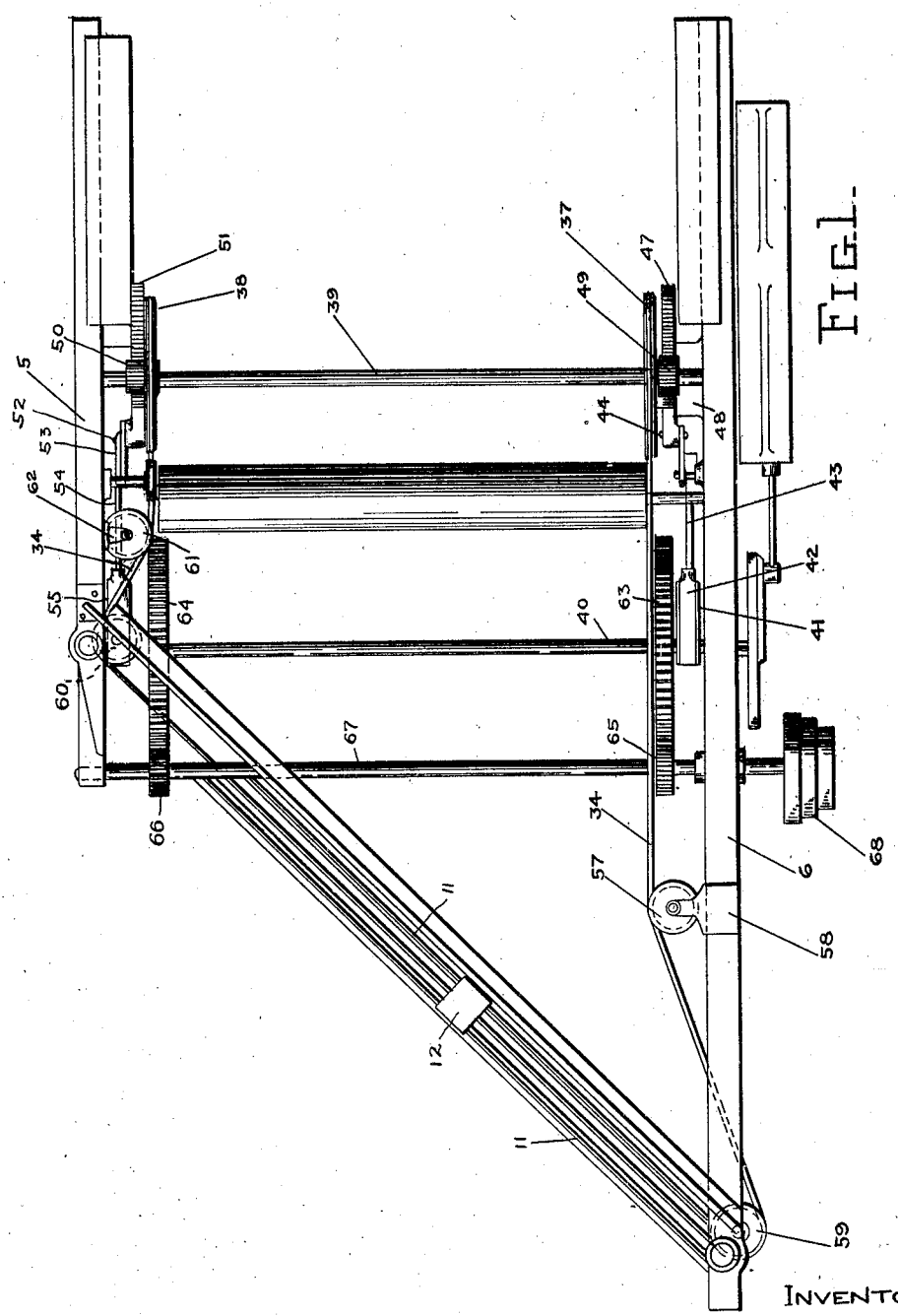
Figure 1 is a plan view.
Figure 2:
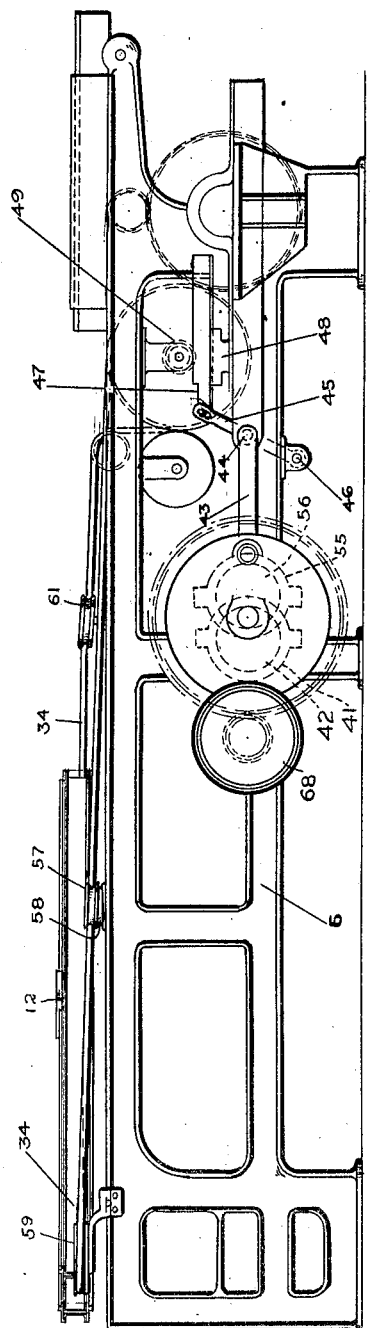
Figure 2 is a side elevation.
Figure 3:
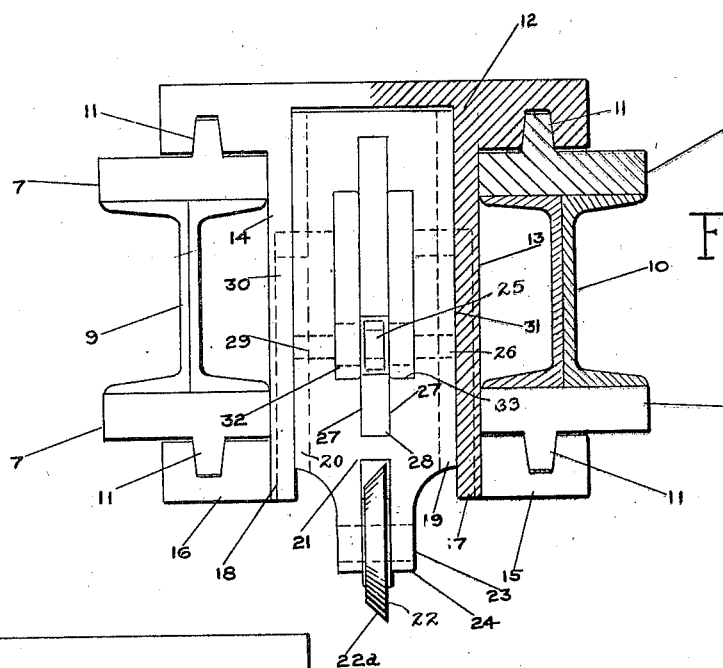
Figure 3 is a vertical sectional view on an enlarged scale of the cutter and its beams.
Figure 4:
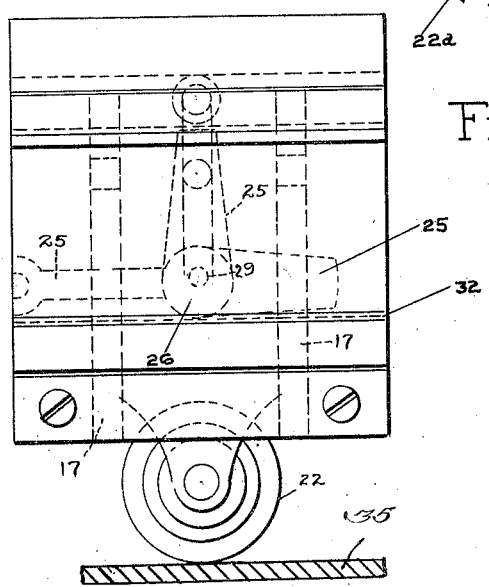
Fig. 4 is a side elevation of the knife carrier, with the stationary cutting element shown in section.

Referring to the accompanying drawings 5 designates one side of a frame and 6 the opposite side thereof. On this frame a shearing mechanism including the guides 7 and 8 and the connecting I beams 9 and 10 are arranged. Two guides 7 are secured to the I beam 9 and two guides 8 are secured to the I beam 10 and each of said guides is provided with a longitudinal guiding rib or flange 11 located midway between the opposite sides thereof. Two pairs of guides 7 and 8 are spaced from each other to receive a carrier frame consisting of the head plate 12 and the side plates 13 and 14. The side plates 13 and 14 are spaced from each other and carry on their lower ends the guide members 15 and 16 which are provided with longitudinal grooves to receive the base guide ribs 11 while the head plate 12 is provided with similar grooves to receive the top guide ribs 11. The side plates 13 and 14 are provided with vertically disposed guide ways 17 and 18 in which the extensions 19 and 20 of the shearing knife frame 21 are arranged to slide vertically.

The shearing knife frame 21 has a rotary knife 22 journaled thereon by means of the shaft 23 and this knife is shown to have a beveled cutting edge 22ª and rotates between the sides of the bifurcated end portion 24 of the frame 21. Eccentric carrying levers 25 are pivoted at 26 to the frame 21 and are adapted to have a bearing against the shoulders or sides 27 of the slot 28 of said frame 21. The shaft 29 of said levers carries eccentrics 30 and 31 which are adapted to engage the horizontal shoulders 32 and 33 of the frame 21. The operating cable or rope 34 is secured at one end to one arm of the lever 25 and at the other end to the other arm of said lever, said lever having arms disposed at right angular relation to each other, so that when the rope is pulled in one direction the lever will be swung on its axis due to the action of the eccentrics 30 and 31 and the cutting wheel 22 will be elevated from cutting engagement with the cutting element 35 and when the rope is pulled in the opposite direction the cutting wheel will be lowered.

One end of the operating cable or rope 34 is secured to the winding drum or grooved wheel 37 and the other end is secured to a similar grooved wheel 38 both of which are arranged on the opposite end portions of the shaft 39 journaled on the frame members 5 and 6. The frame member 6 is considerably longer than the frame member 5 and supports one end of the eccentric shaft 40, the other end of which is supported by the frame member 5. The eccentric shaft 40 carries on one end an eccentric 41 which is engaged by the eccentric strap 42 and to this eccentric strap 42 a pitman or rod 43 is connected. The rod 43 is pivotally connected at 44 with the rod 45, the lower end of which is pivoted at 46 to the frame 6 and the upper end of which is slotted and pivotally connected to the rack bar 47 which is arranged to slide on the guide head 48. The rack head 48 engages a pinion gear 49 carried by the shaft 39.

The other end portion of the shaft 39 carries a pinion gear 50 which is engaged by the rack 51 and this rack slides on a guide head similar to the guide head 43 and said rack is pivotally connected at 52 with the connecting rod 53 which is pivotally connected with the pitman rod 54 connected with the eccentric strap 55 of the eccentric 56 which is mounted on the shaft 40. The length of the cable 34 leading from the pulley or grooved wheel 37 engages a guide wheel 57 mounted on the bracket 58 secured to the frame member 6 and said cable 34 then passes over a grooved guide wheel 59 journaled on a vertical axis on one end of the guide bars of the shearing mechanism and then passes over another guide pulley 60 on the opposite end of said guide bars and engages a pulley wheel 61 mounted on the bracket 62 carried by the frame member 5. The cable is then past over and secured to the grooved wheel 38.

The shaft 40 carries relatively large gears 63 and 64 which are driven by pinion gears 65 and 66 carried by the shaft 67 journaled on said frame members 5 and 6 one end of which is provided with stepped belt driven pulleys 68. When the shaft 67 is driven the cable 34 will be driven in one direction and then in the opposite direction due to the action of the racks and the eccentrics and when the cutter moved by the cable reaches the limit of its cutting stroke the reverse movement of the cable will lift the cutter to inoperative position and the cutter will be maintained in this position during its return movement. During its cutting stroke the cutter will roll against the fabric and thus produce an efficient cutting action on the fabric. The eccentric mechanism is old and well known in this art, the invention consisting in the knife carrier and the means in combination with the eccentric mechanism for automatically shifting the knife to a non-cutting position on the return movement of the knife.

Having described my invention I claim:

1. A shearing machine comprising a frame, a guide arranged on the frame in diagonal relation to the frame, a cutter frame movable on the guide, a cutter having rotary movement on said cutter frame and relative vertical movement thereon, means for shifting the cutter vertically on said cutter frame, a cable connected with said cutter for moving the same on said guide and means for operating said cable to drive the same in both directions.

2. A shearing machine comprising a frame, a guide located diagonally with relation to the frame, a second frame slidable on said guide, a cutter having vertical movement on said second frame and adapted to rotate on said second frame, means for shifting said cutter vertically on said second frame, and means for moving said cutter on said guide in both directions.

3. A shearing machine comprising a frame, a guide located diagonally with relation to the frame, a second frame slidable on said guide, a cutter having vertical movement on said second frame and adapted to rotate on said second frame, means for shifting said cutter vertically on said second frame, means for moving said cutter on said guide in both directions and means for automatically reversing said driving means when said cutter reaches the end of movement in either direction.

4. A shearing machine comprising a guide, a frame slidable on the guide, a second frame slidable on said first frame, said second frame having a rotary cutter mounted thereon, an eccentric lever carried by said second frame and arranged to vertically shift said second frame and cutter on said first frame, and driving means connected with said eccentric lever.

5. A shearing machine comprising a guide, a frame slidable on the guide, a second frame slidable on said first frame, said second frame having a rotary cutter mounted thereon, an eccentric lever carried by said second frame and arranged to vertically shift said second frame and cutter on said first frame, and connected with said eccentric lever.

6. A cutter head comprising a frame having a rotary knife pivoted thereon, vertical guides for the frame, said guides having shoulders, eccentrics engaging the shoulders to vertically shift the frame and the guides, and levers connecting with the eccentrics for operating the same to vertically shift the frame and the rotary knife.

Signed by me at Chicopee Falls.

RICHARD H. LANSING.